United States Patent [19]

Struthers

[11] Patent Number: 4,659,559
[45] Date of Patent: Apr. 21, 1987

[54] GAS FUELED FUEL CELL

[76] Inventor: Ralph C. Struthers, 39503 Calle El Fuente, Saugus, Calif. 91350

[21] Appl. No.: 801,428

[22] Filed: Nov. 25, 1985

[51] Int. Cl.[4] .......................... H01M 8/14; H01M 4/86
[52] U.S. Cl. ......................................... 429/46; 429/41; 429/44; 429/16
[58] Field of Search .......................... 429/16, 41, 44, 46

[56] References Cited

U.S. PATENT DOCUMENTS

| | | | |
|---|---|---|---|
| 3,981,749 | 9/1976 | Fukuda et al. | 429/41 |
| 4,129,685 | 12/1978 | Damiano | 429/44 X |
| 4,301,218 | 11/1981 | Benczur-urmossy | 429/44 X |
| 4,329,403 | 5/1982 | Baker | 429/16 X |
| 4,341,848 | 7/1982 | Liu et al. | 429/44 X |
| 4,526,845 | 7/1985 | Reiser et al. | 429/41 |

Primary Examiner—Brian E. Hearn
Assistant Examiner—Stephen J. Kalafut
Attorney, Agent, or Firm—Georges A. Maxwell

[57] ABSTRACT

A gas fueled fuel cell including spaced anode and cathode electrode parts defining anode and cathode gas chambers, means to conduct anode and cathode fuel gases into the chambers and a unit between the parts and separating the chambers. Said unit includes spaced rigid gas and liquid permeable anode and cathode laminates with outer surfaces disposed toward the anode and cathode chambers. Said outer surfaces have catalytic material deposited thereon and establish chemically reactive interfaces between the laminates and their related chambers. The outer surfaces are covered with gas permeable hydrophobic barriers. The cell next includes spacer means between the laminates including a layer of gas and liquid permeable dielectric material. Finally, the cell includes an ion permeable electrolyte compound between spaced opposing inner surfaces of the gas and liquid permeable laminates. The electrolyte is an acid-salt compound which is solid at temperatures below the operating temperatures of the cell and becomes liquid and has increased ion permeability when the cell is heated to operating temperature by chemical reaction therein.

11 Claims, 5 Drawing Figures

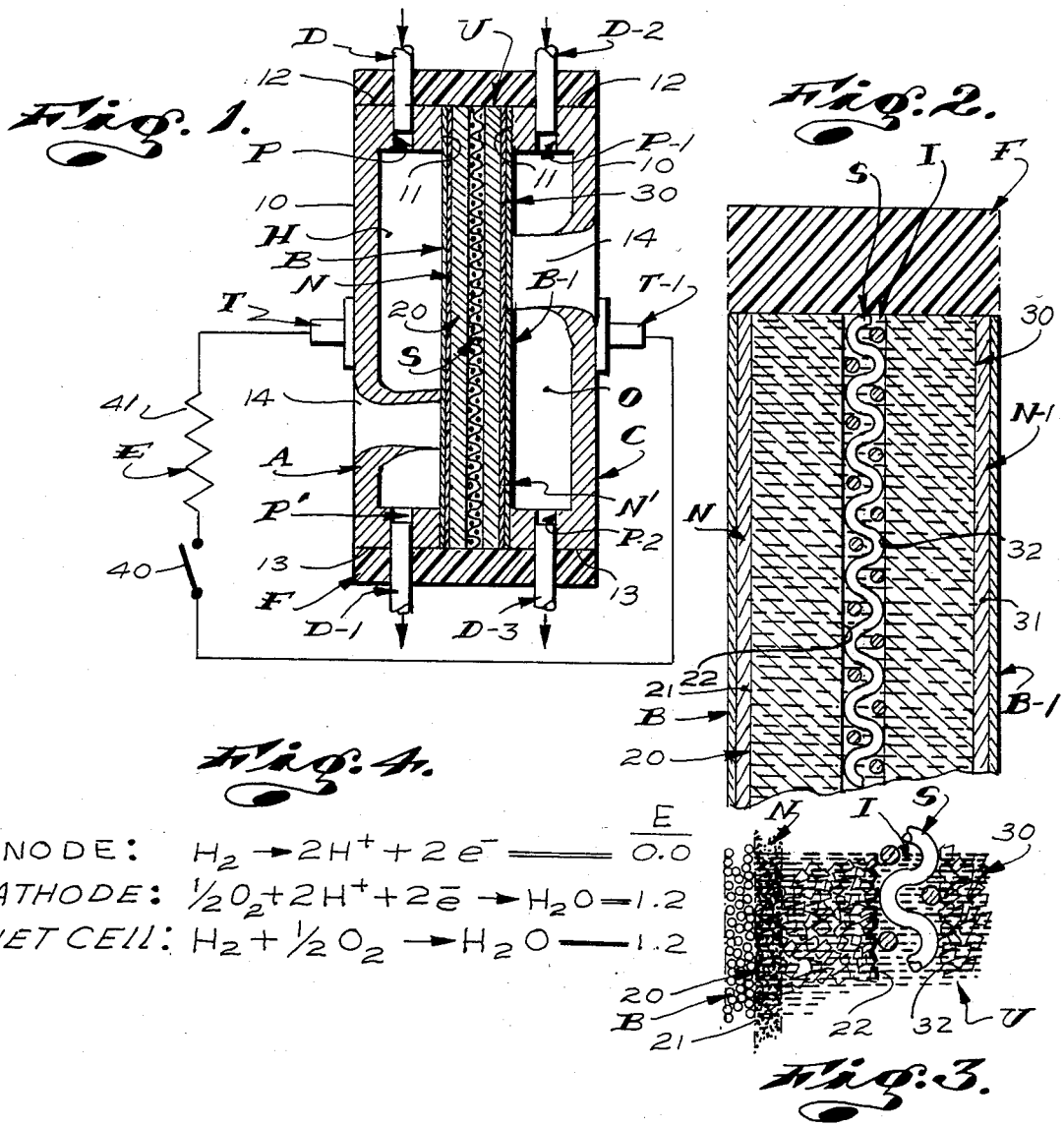
Fig. 1. Fig. 2. Fig. 3.
Fig. 4.
ANODE: $H_2 \rightarrow 2H^+ + 2e^- \quad\underline{\quad\quad} = \dfrac{E}{0.0}$
CATHODE: $\tfrac{1}{2}O_2 + 2H^+ + 2\bar{e} \rightarrow H_2O = 1.2$
NET CELL: $H_2 + \tfrac{1}{2}O_2 \rightarrow H_2O \quad\underline{\quad\quad} 1.2$
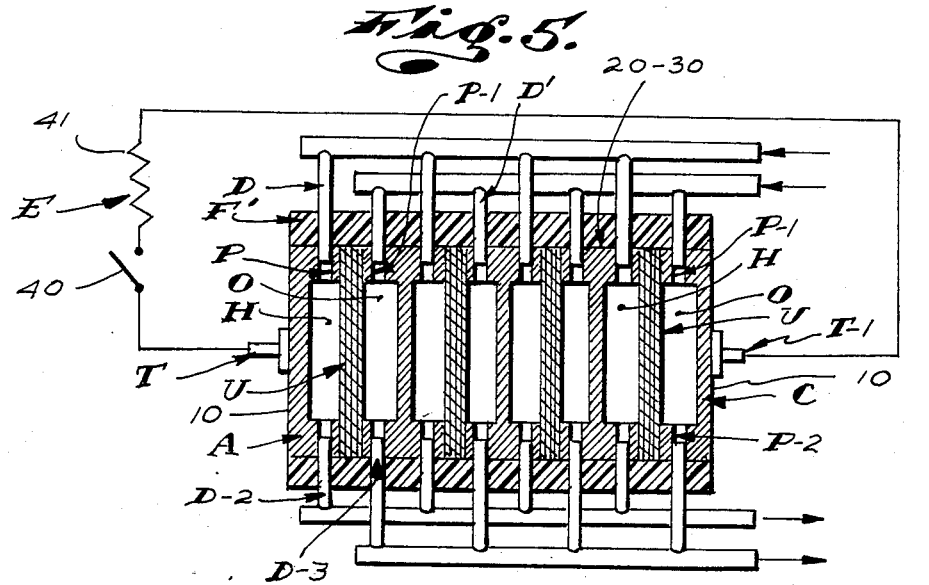
Fig. 5.

GAS FUELED FUEL CELL

This invention has to do with fuel cells and is particularly concerned with a novel cell structure for gas fueled fuel cells.

BACKGROUND OF THE INVENTION

In the art of fuel cells, it has long been recognized that there are a number of gases, such as hydrogen and oxygen which are highly energetic fuels.

For many years, those working in the prior art have sought to establish and provide fuel cell structures which are particularly suitable for using selected gases as fuels. To the best of my knowledge and belief, all of those gas fueled fuel cell structures proposed and/or provided by the prior art have been wanting in one way or another and none has proven to be of practical utility. The above is particularly true in those instances where both the anode and cathode sides or sections of fuel cells are intended to utilize gaseous fuels. Typically, the fuel cell structures provided by the prior art in which gas or gases are used as fuel are extremely complicated and costly to make, maintain and operate. All such fuel cell structures of which I am aware have been characterized by weak and fragile parts and elements which render them unsuitable for a great number of practical applications and use. Further, those fuel structures of which I am aware often include and are dependent upon large, complicated and costly gas handling support systems and are such that they cannot be made and provided in a small and compact form which might lend them to being put to practical use and/or commercially exploited.

OBJECTS AND FEATURES OF THE INVENTION

It is an object of my invention to provide a novel fuel cell structure in which two selected gases such as hydrogen and oxygen are used as fuels for and/or establish the anode and cathode electrode fuels of the fuel cell.

It is an object and feature of my invention to provide a fuel cell structure of the general character referred to above that defines anode and cathode gas chambers and that includes an integrated laminated anode and cathode plate unit between and separating the chambers and which define spaced anode and cathode reaction interfaces disposed toward the anode and cathode chambers and which includes an acid-salt compound electrolyte or ion exchanger between said interfaces.

It is another object and feature of my invention to provide a novel fuel cell structure of the general character referred to above wherein the anode and cathode reaction interfaces are established and/or defined at outer oppositely disposed surfaces of structurally strong and durable anode and cathode collector plates or laminates which are disposed toward their related anode and cathode gas chambers and wherein the electrolyte or ion exchanger occurs within and between spaced opposing inner surfaces of said anode and cathode laminates.

Yet another object and feature of my invention is to provide a novel fuel cell structure of the general character referred to above wherein the anode and cathode laminates are established of porous material, such as carbon, the opposing inner surface portions of which receive and are filled with the electrolyte or ion exchanger.

It is another object and feature of my invention to provide a fuel cell structure of the general character referred to above wherein the electrolyte or ion exchanger is established of a normally solid acid-salt compound having a low melting temperature which is below the range of the operating temperature of the cell, whereby said exchanger becomes a fluid during fuel cell operation; and a cell structure wherein the ion exchanger is sealingly contained within and between the anode and cathode laminates in structural supporting relationship therewith.

A further object and feature of my invention is to provide a novel fuel cell structure of the general character referred to above wherein the outer surface portions of said anode and cathode laminates are impregnated with and/or carry catalyst materials to support chemical reaction and in which the said outer surfaces of said laminates are covered or coated with gas permeable hydrophobic barriers which allow for gases to move into contact and react with the ion exchanger at interfaces defined by the catalyst materials.

It is an object and feature of my invention to provide a novel fuel cell structure of the general character referred to above which is such that a multiplicity of like cells can be easily and economically related to each other in series and/or in parallel to provide series and/or batteries of said cells to satisfy a large range of power supply requirements.

It is an object and feature of my invention to provide a fuel cell structure of the general character referred to above wherein the anode and cathode gas chambers are established by electric current conducting plates or body parts positioned adjacent and sealingly related to the outer surfaces of their related anode and cathode laminates.

Finally, it is an object and feature of my invention to provide a novel fuel cell structure of the general character referred to above with a gas anode and a gas cathode and which is structurally strong and sound, can be made small and compact, lends itself to being mass-produced at low cost, and can be conveniently combined with and/or related to any desired number of like cells to establish a single fuel cell assembly or a battery of fuel cell assemblies to meet and satisfy a wide range of power output requirements.

The foregoing and other objects and features of my invention will be apparent and fully understood from the following detailed description of typical preferred forms and embodiments of my invention, throughout which description reference is made to the accompanying drawings.

DESCRIPTION OF THE DRAWINGS

FIG. 1 is a sectional view of a single fuel cell embodying my invention;

FIG. 2 is an enlarged view of a portion of the structure shown in FIG. 1;

FIG. 3 is an enlarged view of a portion of the structure shown in FIG. 2;

FIG. 4 sets forth the chemical reaction; and

FIG. 5 is a cross-sectional view of a plurality of series related fuel cells embodying my invention.

DETAILED DESCRIPTION OF THE INVENTION

In FIG. 1 of the drawings, I have shown a single elongate fuel cell embodying my invention and defining opposite anode and cathode ends. That cell structure illustrated includes plate or block like anode and cathode body parts A and C, each of which is characterized by an outer end surface 10 and an inner surface 11. The parts A and C are shown as being substantially square in cross-section and as having flat tops, bottoms and opposite sides 12, 13 and 14. The body parts A and C have longitudinally inwardly opening cavities entering their inner surfaces 11 and defining inwardly opening anode and cathode gas chambers H and O, respectively. The anode part A has vertically extending gas ports P and P' at its top and bottom communicating with the chamber H. The cathode part C has a vertically extending gas inlet port P-1 entering its top side 12 and communicating with the chamber O and a waste port P-2 entering its bottom side 13 and communicating with the chamber O.

The body parts A and C are made of an electric conductive metal and serve as and will hereinafter be referred to as the anode and cathode electrode parts of the fuel cell structure. In practice and as shown, the anode and cathode electrode parts A and C can have terminal posts T and T-1 fixed to them, as clearly shown in the drawings.

The fuel cell structure that I provide next includes a flat plate-like central or intermediate laminated unit U positioned between the electrode parts A and C in sealed relationship therewith. The unit U overlies and closes the chambers H and O and separates those chambers, one from the other.

As shown in FIG. 2, the laminated unit U includes a flat, plate-like, current collecting anode laminate 20 with an outer surface 21 opposing the anode electrode A and a flat inner surface 22; a flat, plate-like, current collecting cathode laminate 30 with an outer surface 31 opposing the cathode electrode C and a flat inner surface 32 in spaced opposing relationship with the inner surface 22 of the laminate 20.

The unit U next includes a central or intermediate electrolyte or ion exchanger I in the form of a mass of ion permeable material between the laminates 20 and 30.

In the preferred form and carrying out of my invention and as shown, a separator screen of dielectric material, such as woven fiberglass screen, is positioned between the laminates 20 and 30 to maintain them in predetermined spaced relationship from each other and in and through which the ion exchanger or electrolyte I extends and is free to flow.

The anode and cathode laminates 20 and 30 are established of porous conductive material such as carbon and serve as current collectors. The laminates 20 and 30 can be established of high surface area, particulate carbon, fused or otherwise suitably bonded together and are sufficiently porous to receive and accommodate the material or compound which is used to establish the ion exchanger I.

The outer porous surfaces 21 and 31 of the laminates 20 and 30 are treated with and carry deposits of catalyst materials N and N-1. The catalyst materials N and N-1 occur at the surfaces 21 and 31 and within the pores of the laminates adjacent thereto and establish active interface zones at said outer surfaces 21 and 31 of said laminates.

In reducing my invention to practice, the catalyst material used was platinum (Pt). However, other known catalyst materials such as manganese, iron, cobalt, copper, nickel, selenium, ruthenium, rhodium, palladium, silver, indium, antimony, tellarium, tungsten, rhemium, osmium, iridium, and gold might well be used, separately or in suitable combinations, without departing from the spirit of my invention.

In practice, the metal catalyst material can be most effectively used and applied to the surfaces 21 and 31 of the laminates 20 and 30 by treating and coating the active sites of finely divided powder-like particles of high surface area carbon with the catalyst materials, depositing the treated and coated powder-like material onto the surfaces 21 and 31 of the porous carbon laminates 20 and 30 and forcibly working it into the surface areas of those laminates. Thus, the catalyst treated carbon material substantially fills the porous surfaces 21 and 31 and establishes thin and effectively highly active interface zones at the surfaces 21 and 31 of the laminates and between the remainder of those laminates and their related gas chambers H and O.

The electrolyte material establishing the ion exchanger I of the unit U enters or flows into and fills the porous material of the laminates 20 and 30 up to the interface zones thereof occupied by the catalyst materials and is in contact with said catalyst materials.

Finally, the unit U includes outer barriers B and B-1 of gas permeable hydrophobic material on the outer surfaces 21 and 31 of the laminates 20 and 30. The barriers B and B-1 permit gas in the chambers H and O to move inwardly into reactive contact with the catalyst materials N and N-1 in the interface zones of the laminates 20 and 30 and prevents the opposite or outward flow of the electrolyte of the ion exchanger I within and from the unit U and into the chambers H and O.

In practice, the barriers B and B-1 can be established of any one of a number of commercially available gas permeable hydrophobic plastic films suitably bonded to the surfaces 21 and 31 of the laminates 20 and 30.

In my reduction of practice of the invention, the barriers B and B-1 consist of porous deposits of that fluorocarbon polymer sold by DuPont as "T-30 Teflon Suspension". That material was first sprayed onto the surfaces 21 and 31 of the laminates 20 and 30 and was thereafter sintered and mechanically bonded to or with the surfaces 21 and 31 of the laminates 20 and 30 by the application of heat.

The anode and cathode electrode parts A and C and the unit U are arranged and clamped or held in tight sealing engagement with each other and are then held assembled by a frame F about the exterior or sides of the assembly. In my reduction to practice of the invention, the frame F is a mass of silicone elastomer suitably molded about its related assembly of parts.

The cell structure that I provide and as shown in the drawings includes gas inlet ducts D and D-1 connected with and extending outwardly from the ports P, P' and P-1 to connect with suitable supplies of gas (not shown) and outlet ducts D-2 and D-3 connected with and extending outwardly from the ports P-1 and P-2.

Finally, and as shown in the drawings, the terminals T and T-1 and the anode and cathode electrodes A and C are connected with the opposite ends of an exterior electric circuit E. The circuit E is shown as including a switch 40 and a resistance 41. The resistance 41 indicates a workload served by the cell.

In furtherance of my invention, the ion exchanger I is preferably a normally solid ion permeable compound which cooperates with the laminates 20 and 30, the screen S and the frame F to establish a strong, stable and rigid solid state assembly or unit U which is capable of withstanding extraordinary abuse. The compound of which the ion exchanger I is established is a poor conductor of ions when solid and an excellent conductor of ions when in a liquid or molten state. The exchanger I is an acid meterial with a $pk_1$ value of 1.0 or less. Trichloroacetic acid is one effective acid with a suitable low $pk_1$ value. The exchanger I is a solid at ambient temperature, has relatively low melting temperature and is such that it can be easily and conveniently made molten when fabricating the unit U. Further, the melting temperature of the compound of which the exchanger I is made is slightly below the minimum operating temperature of the fuel cell, that is, below the minimum temperature generated by the chemical reaction within the cell during operation thereof. Still further, the boiling temperature and/or temperature of vaporization of the compound of which the exchanger I is made is above or greater than the maximum anticipated operating temperature of the fuel cell. Accordingly, while the exchanger I is normally solid when the cell is not in operation, it is liquid and an effective conductor of ions when the cell is in operation. When the exchanger I is liquid or a melt, it is maintained captive within the structure of the unit U and continues to lend structural support thereto. Though the structural support afforded by the exchanger I is less when it is in a liquid state than when it is in a solid state, that support which it does lend is substantial due to the manner in which it is confined within the unit.

In my reduction to practice, the electrolyte compound used to establish the ion exchanger I was trichloroacetic acid ($CCl_3COOH$) with a melting point of 57.5° C. and a boiling point of 197.5° C. mixed with equal parts of antimony trichloride ($SbCL_3$) with a melting point of 73.2° C. and a boiling point of 223.5° C. It is to be noted that the melting point of the electrolyte or ion exchanger I is above normally encountered high ambient temperatures of 100° to 150° F. Accordingly, the compound is an acid-salt melt and can and will be defined as such in the following.

It is to be noted at this time that the minimum operating temperature of my cell is about 212° F.

Since the operating temperature of the fuel cell is at and likely to greatly exceed 212° F., it is necessary that the acid-salt melt electrolyte or ion exhanger I be substantially free of any material that might vaporize or boil and create internal pressures within the unit U, during fuel cell operation.

Accordingly, it is necessary that the electrolyte compound or ion exchanger I have a high equivalent conductivity.

A search for other low melt ion permeable compounds with high boiling temperatures and which might be used to establish my ion exchanger 1 indicates or suggest that the following compounds can or might be used to advantage: $SbBr_3$, $SbCl_3$, $SBI_3$, $BI_3$, $AlCl_3$, $C_2Br_4$, $NbF_5$, $ReO_3Br$, $ReOCl_4$, $SeOBr_2$, $Si_2Br_4$, $SiI_4$, $TaF_5$, $SnBr_2I_2$ and $TiBr_4$; and the acids of $H_2CrO_4$, $HB_r$, $HCl$, $H_2SeO_4$ and $H_2SO_4$ might also be used to advantage.

FIG. 4 of the drawings is a formula showing the chemical reaction which takes place during operation of my new fuel cell when, for example, the anode gas fuel is hydrogen ($H_2$) and the cathode gas fuel is oxygen ($O_2$).

To start fuel cell operation, the cell structure is suitably heated to approximately 160° F. to melt and put the ion exchanger I in a liquid or fluid state, where it becomes highly ion permeable. Heating and transforming the ion exchanger I into a liquid state and to commence operation of my cell structure can be effected by directing or conducting a flow of current to the cathode terminal to the cell structure and to thereby induce chemical reaction at the cathode side or surface of the unit U, which reaction generates the necessary heat to put the exchanger I in a molten or liquid state.

When in operation, hydrogen gas is conducted into the chamber H, the hydrogen gas moves through the barrier B into the interface zone of the laminate 20 defined by the catalyst N where it reacts to generate two hydrogen ions (2H+) and two free electrons (2e−). The two hydrogen ions move through the porous anode laminate 20 and the electrolyte or ion exchanger I into the porous cathode laminate 30 to the catalyst material N-2 in the interface zone of the cathode laminate 30.

The two free electrons (2e−) generated at the anode section of the cell are conducted from the cell into and through the external electric circuit E to the cathode electrode part C of the cell and thence to the outer surface 31 of the cathode laminate 30 where they move through the barrier B-1 and onto and throughout the catalyzed interface zone N-1 of the laminate 30 and react with the hydrogen ions (2H+) electrons and oxygen to generate water ($H_2O$).

The water generated is hot and in the form of steam, that is, it is in a gaseous state. The water ($H_2O$) generated at the reaction interface zone of the cathode laminate 30, being hot and gaseous, is such that it is free to move out through the barrier B and into the chamber O. The water vapor or steam introduced into the chamber O might condense therein and drop to the bottom thereof where it is free to flow through the port P-2 to waste. If the water vapor or steam does not condense in the chamber O, it is flushed out of the chamber by maintaining a flow of oxygen into the chamber O through the port P-1 and out through the port P-2.

From an examination of FIG. 4 of the drawings and in light of the above, it will be apparent that the chemical reaction within and/or afforded by my new fuel cell structure is extremely simple and effective. It will also be apparent that the fuel cell structure is itself rather simple and/or such that it embodies no structural features and/or characteristics which might adversely affect its utility and durability or which might prevent easy and economical mass production of fuel cells embodying my invention.

In FIG. 5 of the drawings, I have shown a second form of my invention wherein an elongate series of series-connected cells embodying my invention is shown. In this form of my invention, the anode and cathode electrode parts A and C at the opposite ends of the series of cells are the same as in the form of my invention shown in FIG. 1. The other electrode parts A-C between the ends of the series of cells are formed to establish a pair of oppositely disposed chambers O and H. All of the several units U are alike. Further, the ports P, P', P-1 and P-2 for the several cells are connected to suitable related gas and waste manifolds as clearly illustrated. In this second embodiment of my invention, the several electrode parts A, C, A-C and their related units U are carried and maintained in operating relationship with each other by a frame F', "which is functionally" similar to the frame F in the first form of my invention.

Apart from the special form of the electrode parts A-C in the second form of my invention, all elements and parts of the several cell structures of the series of cells are identical with corresponding parts of the cell shown in FIG. 1 "with corresponding parts of the cell shown in FIG. 1."

Having described only typical preferred forms and embodiments of my invention, I do not wish to be limited to the specific details herein set forth but wish to reserve to myself any modifications and/or variations that might appear to those skilled in the art and which fall within the scope of the following claims:

Having described my invention, I claim:

1. An elongate fuel cell structure including an anode electrode part at one end defining a longitudinally inwardly opening anode gas chamber, a cathode electrode part at the other end defining a longitudinally inwardly opening cathode gas chamber spaced from and opposing the anode gas chamber, said anode and cathode electrode parts have ports communicating with said chambers and connected with supplies of anode and cathode fuel gases, an intermediate unit between and separating the anode and cathode parts and the anode and cathode gas chambers, said unit includes a pair of longitudinally spaced structurally sound and dimensionally stable porous gas and liquid permeable anode and cathode laminates with flat, longitudinally outwardly disposed outer surfaces disposed toward their related anode and cathode chambers and flat spaced opposing inner surfaces, deposits of catalytic material at the outer surfaces of the andode and cathode laminates establishing chemically reactive interface zones at those surfaces, gas permeable hydrophobic barriers at the outer surfaces of said laminates between the gas chambers and chemical reaction interface zones at said laminates, an ion permeable acid-salt melt electrolyte compound between the laminates and permeating the laminates to said chemical reaction interface zones, a dielectric frame structure about the perimeter of the unit between the opposite ends thereof holding said parts and laminates together and sealingly containing the electrolyte within the unit and electric terminals on the anode and cathode parts connected with an external electric circuit conducting free electrons from the anode part and to the cathode part.

2. The elongate gas fueled fuel cell structure set forth in claim 1 which further includes a flat, porous, dielectric spacer in the electrolyte between and in supporting engagement with the inner surfaces of said laminates.

3. The elongate gas fueled fuel cell structure set forth in claim 1 wherein the ion permeable electrolyte is a a normally solid ionic acid-salt compound, the melting temperature of which is between 100° F. and 212° F. and the temperature of vaporization of which is above the maximum temperature generated by chemical reaction in the fuel cell during operation of the fuel cell.

4. The elongate gas fueled fuel cell structure set forth in claim 1 which further includes a flat, porous, dielectric spacer in the electrolyte between and in supporting engagement with the inner surfaces of said laminates, the ion permeable electrolyte is a normally solid ionic acid-salt compound, the melting temperature of which is between 100° F. and 212° F. and the temperature of vaporization of which is above the maximum temperature generated by chemical reaction in the fuel cell during operation of the fuel cell.

5. The elongate gas fueled fuel cell set forth in claim 1 wherein the anode fuel gas is hydrogen and the cathode fuel gas is oxygen, the byproduct of chemical reaction at the interface zone of the cathode laminate is $H_2O$ at a temperature above the temperature of vaporization of $H_2O$ and above the melting temperature of the ion permeable acid-salt electrolyte, said vaporous $H_2O$ moves outward through the gas permeable hydrophobic barrier at the outer surface of the cathode laminate into the cathode gas chamber and said cathode part has a port conducting the byproduct from the cell structure to waste.

6. The elongate gas fueled fuel cell set forth in claim 1 wherein the anode fuel gas is hydrogen and the cathode fuel gas is oxygen, the byproduct of chemical reaction at the interface zone of the cathode laminate is $H_2O$ at a temperature above the temperature of vaporization of $H_2O$ and above the melting temperature of the ion permeable acid-salt electrolyte, said vaporous $H_2O$ moves outward through the gas permeable hydrophobic barrier at the outer surface of the cathode laminate into the cathode gas chamber and said cathode part has a port conducting the byproduct from the cell surface to waste, the cell further includes a flat, porous, dielectric spacer in the electrolyte between and in supporting engagement with the inner surfaces of said laminates.

7. The elongate gas fueled fuel cell set forth in claim 1 wherein the anode fuel gas is hydrogen and the cathode fuel gas is oxygen, the byproduct of chemical reaction at the interface zone of the cathode laminate is $H_2O$ at a temperature above the temperature of vaporization of $H_2O$ and above the melting temperature of the ion permeable acid-salt electrolyte, said vaporous $H_2O$ moves outward through the gas permeable hydrophobic barrier at the outer surface of the cathode laminate into the cathode gas chamber and said cathode part has a port conducting the byproduct from the cell structure to waste, the ion permeable electrolyte is a normally solid ionic compound, the melting temperature of which is between 100° F. and 212° F. and the temperature of vaporization of which is above the maximum temperature generated by the chemical reaction in the fuel cell during operation of the fuel cell.

8. The elongate gas fueled fuel cell set forth in claim 1 wherein the anode fuel gas is hydrogen and the cathode fuel gas is oxygen, the byproduct of chemical reaction at the interface zone of the cathode laminate is $H_2O$ at a temperature above the temperature of vaporization of $H_2O$ and above the melting temperature of the ion permeable acid-salt electrolyte, said vaporous $H_2O$ moves outward through the gas permeable hydrophobic barrier at the outer surface of the cathode laminate into the cathode gas chamber and said cathode part has a port conducting by byproduct from the cell structure to waste, the cell further includes a flat, porous, dielectric spacer in the electrolyte between and in supporting engagement with the inner surfaces of said laminates, the ion permeable electrolyte compound is a normally solid ionic compound, the melting temperature of which is between 100° F. and 212° F. and the temperature of vaporization of which is above the maximum temperature generated by chemical reaction in the fuel cell during operation of the fuel cell.

9. The elongate gas fueled fuel cell set forth in claim 1 wherein the anode fuel gas is hydrogen and the cathode fuel gas is oxygen, the byproduct of chemical reaction at the interface zone of the cathode laminate is $H_2O$ at a temperature above the temperature of vaporization of $H_2O$ and above the melting temperature of the ion permeable acid-salt electrolyte, said vaporous $H_2O$ moves outward through the gas permeable hydrophobic barrier at the outer surface of the cathode laminate into the cathode gas chamber and said cathode part has a port conducting the byproduct from the cell structure to waste, said catalyst material is a selected catalytic metallic material on the active sites of finely divided high surface area carbon which is applied to and within the outer surface portion of said gas and liquid permeable laminates.

10. The elongate gas fueled fuel cell set forth in claim 1 wherein the anode fuel gas is hydrogen and the cathode fuel gas is oxygen, the byproduct of chemical reaction at the interface zone of the cathode laminate is $H_2O$ at a temperature above the temperature of vaporization of $H_2O$ and above the melting temperature of the ion permeable acid-salt electrolyte, said vaporous $H_2O$ moves outward through the gas permeable hydrophobic barrier at the outer surface of the cathode laminate into the cathode gas chamber and said cathode part has a port conducting by byproduct from the cell structure to waste, said catalyst material is a selected catalytic metallic material on the active sites of finely divided high surface area carbon which is applied to and within the outer surface portion of said gas and liquid permeable laminates, said cell further includes a flat, porous, dielectric spacer in the electrolyte between and in supporting engagement with the inner surfaces of said laminates.

11. The elongate gas fueled fuel cell as set forth in claim 1 wherein the anode fuel is hydrogen and the cathode fuel gas is vaporized methanol which is the byproduct of chemical reaction at the interface zone of the cathode laminate of vaporized water and methane, the temperature of which is above the melting temperature of the ion permeable electrolyte, said byproduct of chemical reaction moves through the gas permeable hydrophobic barriers at the surface of the cathode laminate.

* * * * *